Sept. 8, 1959 F. A. HOBERECHT 2,902,800
GRINDING MACHINE
Filed Jan. 8, 1957 3 Sheets-Sheet 3

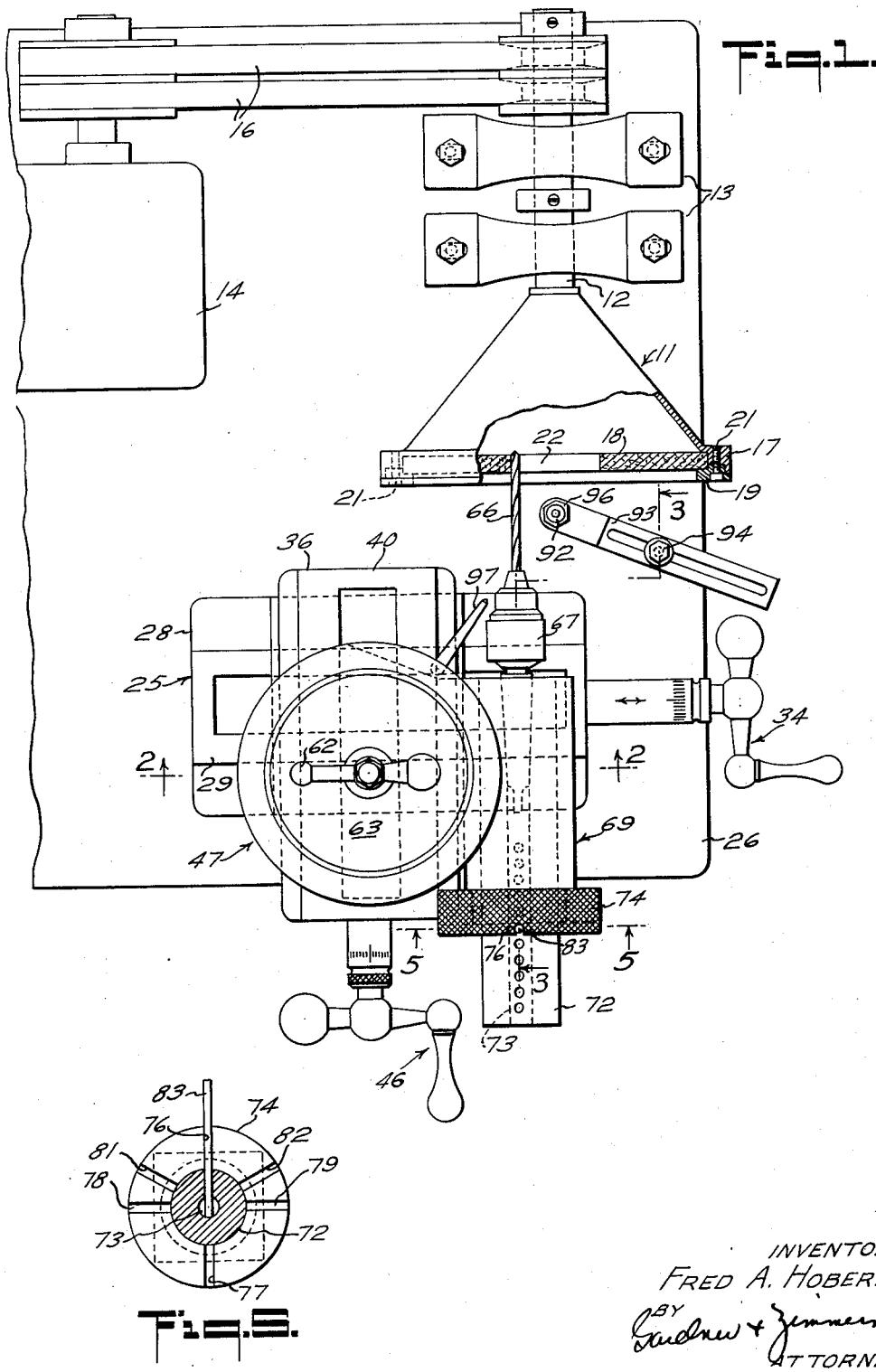

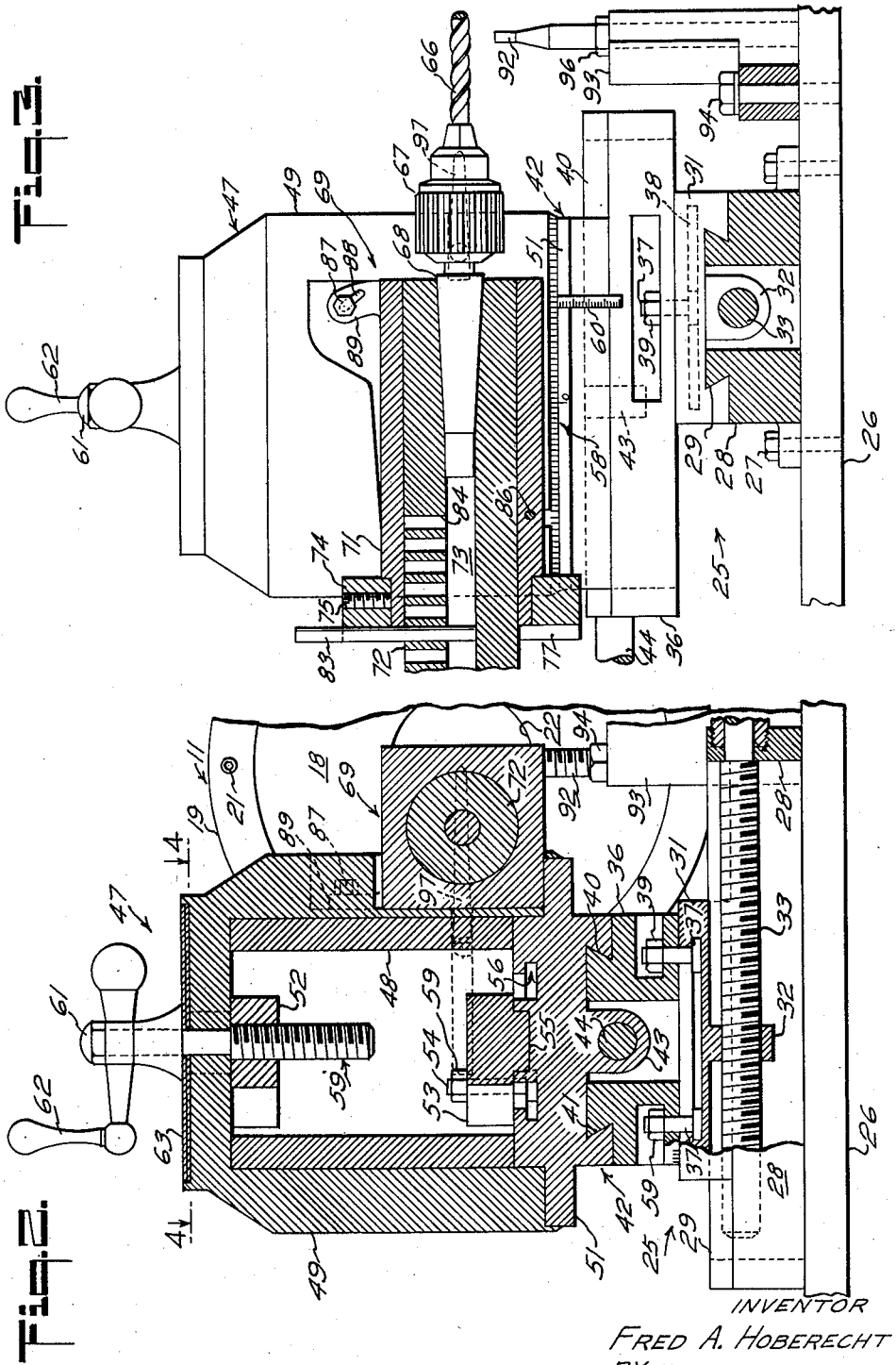

INVENTOR
FRED A. HOBERECHT
BY Gardner & Zimmerman
ATTORNEYS

United States Patent Office 2,902,800
Patented Sept. 8, 1959

2,902,800

GRINDING MACHINE

Fred A. Hoberecht, St. Petersburg, Fla.

Application January 8, 1957, Serial No. 633,034

12 Claims. (Cl. 51—219)

The present invention relates to a machine tool for precision grinding of parts or tools such as, for example, drills and the like and in particular is directed to precision shop apparatus having the capability of accurately grinding a wide variety of forms without the necessity of partial machine disassembly or complicated readjustment.

The modern trend toward accurate machining operations, as for example in the production of identical machine parts, has led to the design and development of specialized machine tools adapted to perform but a single function. Along with this trend there has followed an additional trend toward complication of machining tools such that even those machines capable of more than one limited application require extensive resetting and often partial disassembly for changing from one specific operation to another. As an alternative to the above noted complication which is undesirable in all but the largest plants is found machinery incapable of requisite accuracy or at most only capable of satisfactory results when operated by very high skilled personnel, this in itself being quite disadvantageous in any industry.

The present invention provides a precision machine operable by only nominally skilled personnel and adapted to perform a wide variety of functions without major alteration or breakdown. Of special application is the present invention in the precision grinding of all known types of drills with the use of only built in adjustments requiring no particular talent or knowledge. Furthermore the precision of grinding angles is not left to the operator but instead is built into the invention, again by the use only of simple adjustments.

As a further feature of the present invention and flowing from the foregoing is the rapidity with which the requisite grinding operations may be accomplished for the guarantee of precision results precludes the necessity of time consuming checking and reworking to produce an acceptable end product. Using again the example of drill grinding, two, three and four flute drills of all sizes may be rapidly ground with precision without machine modification merely by turning an element to the desired angles and in fact the aforementioned drills may even be mixed in order of grinding with no appreciable increase in time required for grinding, so simple is the operation.

It is accordingly an object of the present inventtion to provide a grinding machine having a wide versatility of operation with a minimum of adjustment.

It is another object of the present invention to provide a grinding machine having precision stops for a wide variety of operations.

It is a further object of the present invention to provide a grinding machine having numerous degrees of controlled motion for maximized facility and versatility of operations.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The invention is illustrated in the accompanying drawings, wherein:

Figure 1 is a plan view of the grinding machine and illustrating the grinding of drill lands.

Figure 2 is a transverse sectional view in elevation taken at 2—2 of Figure 1.

Figure 3 is a partial longitudinal sectional view in elevation taken at 3—3 of Figure 1.

Figure 5 is a sectional view taken at 5—5 of Figure 1 and illustrating the chuck position adjustments or stops.

Figure 4:
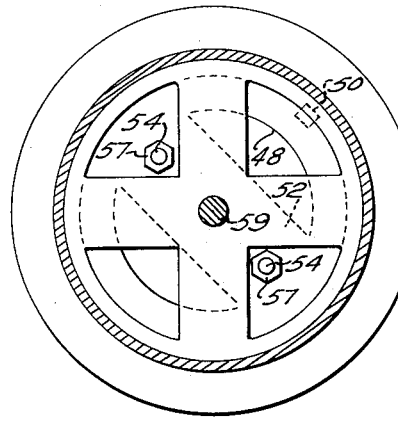
Figure 4 is a sectional view taken at 4—4 of Figure 2 and illustrating the barrel top construction.

The invention in brief comprises a driven grinding wheel holder adapted to retain various types of grinders or emery wheels and disposed adjacent a movable holder adapted to retain elements to be ground. This holder is adapted for precisely controlled positioning with respect to the grinder or emery wheel and including rotatable means affording a full 360 degree swing normal to the grinding wheel axis. As a part of this holder is provided a chuck which is adapted for precision positioning relative to the wheel and further includes angle stop means for rotating the work about an axis in a plane parallel to the axis of the grinding wheel. By the above generally described components including the noted degrees of freedom of motion there is afforded a uniquely adaptable apparatus having the capabilities of a combination of many conventional tools and yet inherently providing a degree of accuracy found only in very specialized equipment.

Considering now the invention in some detail and referring first to Figure 1 there will be seen to be provided a driven conical grinding wheel holder 11 having a shaft 12 affixed to the apex thereof and extending therefrom through pillow blocks 13. Suitable drive for the wheel holder 11 may be provided by a motor 14 having belts 16 connecting the shaft thereof and the aforementioned shaft 12 with speed reduction and variation means included as desired. About the open base of the conical wheel holder 11 is disposed a short cylindrical extension 17 secured to or formed integral therewith and having a stepped inner periphery forming a shoulder against which a grinding wheel 18 is adapted to rest. A collar 19 fits over the grinding wheel periphery and is secured to the holder as by peripheral bolts 21 for firmly anchoring the grinding wheel to the holder across the base thereof.

As to the grinding wheel 18 a wide variety of configurations are possible such as, for example, a cup shape for grinding fillets; however, for grinding certain types of drills, for example, an annular emery wheel is preferable with a circular central aperture 22 therein. The emery wheel 18 as it is hereinafter denominated, although not to the exclusion of shapes other than that of a wheel, is thus firmly affixed to the holder and is rotated therewith by the motor at a speed determined by the drive train composition or arrangement.

In addition to the foregoing grinding means there is provided work holding means including a solid bed 26 in fixed relation to the emery wheel and upon which the emery wheel pillow blocks 13 and motor 14 may be mounted. As best seen in Figures 2 and 3, there is affixed to the bed 26 as by bolts 27 a compound 25 including a guide 28 having an outwardly tapering top key 29 and a central longitudinal slot therein. Atop the guide is disposed a lower carriage 31 having a lower keyway mating with the guide key 29 for slidable relation thereto and a lug 32 depending into the guide slot. An elongated bolt 33 is rotatably mounted in the guide longitudinally through the slot therein and fixed against translation. The bolt 33 is threaded through the lower carriage lug 32 and is provided with a handle 34 at an outer extremity thereof so that by turning the handle to rotate the bolt the lower carriage 31 is moved along the guide. The aforementioned guide and lower carriage are aligned upon the bed to afford motion normal to the axis of the grinding wheel 18 and additional degrees of motion are provided by the following described structure.

Atop the lower carriage 31 and mounted for motion therewith is a mount 36 which is adapted to rotate upon the lower carriage for angular displacement of members in turn disposed atop the mount. Connection between the mount 36 and lower carriage 31 is accomplished by a pair of bolts 37 extending through a lower portion of the mount with the bolt heads below same and disposed in a track about a circular depression 38 in the upper surface of the lower carriage. With these bolts disposed diametrically opposite on the bolt hole circle the mount is effectively locked to the lower carriage by the bolt heads fitting into the radially extended track about the depression 38 and yet the mount is free to turn upon the lower carriage with the bolt heads sliding around the track. At the upper bolt ends nuts 39 are threaded thereon with side indentations in the mount providing access thereto so that they may be loosened to allow rotation of the mount on the lower carriage and tightened to fix the angular mount position on the lower carriage. The mount includes a central longitudinal slot extending almost the entire length thereof and at the top is formed with outwardly flaring sides set in from the full mount width to form a key 40 adapted to fit into a keyway 41 in the under surface of a circular upper carriage or table 42 disposed atop the mount. This upper carriage or table has a central depending lug 43 through which an elongated bolt 44 extends in threaded relation. The latter bolt 44 is horizontally disposed longitudinally within the upper mount slot and is fixed therein for rotation without translation so that turning of the bolt 44 as by means of a handle 46 fixed to an outer extremity thereof operates to move the upper carriage 42 along the key and way connection atop the mount 31.

The upper carriage 42 is adapted to carry a turret or barrel housing support 47 which includes an inner vertical cylinder 48 and an outer housing 49 having a cylindrical central aperture mating with the cylinder 48. The housing and inner cylinder of the turret 47 are keyed together by a key 50 fitting into oppositely disposed keyways in the housing and cylinder and disposed axially of the cylinder so that the housing is slidable axially upon the inner cylinder but fixed for rotation therewith. Only the inner cylinder 48 is attached to the upper carriage 36 with the housing 49 resting upon a flange 51 about the upper carriage or table in the lowest position of the housing. The inner cylinder 48 has a pair of transverse bars across the hollow center thereof with the upper bar 52 fixed across the top of the cylinder and the lower bar 53 across the bottom of the cylinder. It is by means of this lower bar 53 that the entire turret 47 is attached to the upper carriage with the attachment being made via a pair of bolts 54 extending vertically through the bar. The bolts 54 are upended with the bolt heads disposed in a circular track 56 atop the upper carriage and a lip about the top of the depression retains the bolts against vertical motion. The bolts are held in position through the cylinder bar 53 by nuts 57 threaded onto the bolt ends above the bar and the foregoing connection will be seen to fix the inner cylinder of the barrel housing 47 upon the top of the upper carriage or table and yet to provide for rotation of the turret 47 upon the table 42. A pilot or circular boss 55 is provided on the under side of the lower cross bar 53 of the inner cylinder with this pilot mating with a circular indentation in the top center of the table 42. In order to provide a measure of any angular displacement of the housing relative to the carriage a scale 58 may be scribed about a portion of the lower edge of the housing 49 which overlaps the upper carriage flange 51 and a registering reference mark scribed upon the carriage flange, as seen in Figure 3.

Provision is made for controlled vertical displacement of the housing 49 upon the inner cylinder 48 by means of a vertical shaft 59 having a threaded expanded lower end extending through the cylinder top bar 52 in threadable engagement therewith. The housing 49 has a pair of crossed members forming an X atop same and the shaft 59 extends through a bore provided at the central intersection thereof. An enlarged cap 61 is secured to the shaft 59 above the housing with a handle 62 therethrough and a dust plate 63 is fitted atop the housing within a recess therein about the shaft with the cap 61 bearing upon the upper surface thereof. Maximum sealing of the interior of the housing may be provided by splitting the dust plate 63 into two like horizontal plates as shown in Figure 2. A measure of the vertical displacement of the turret may be provided by a scale 60 scribed vertically on a dependency from the turret.

Work, such as a drill 66 shown in Figure 3, is adapted to be supported in a chuck 67 which has movable jaws for gripping various sizes of work pieces and which includes a tapered shank 68 extending axially from the rear thereof. The chuck 67 is mounted upon the above-described turret 47 by means of a barrel housing 69 comprising an elongated billet 71 of square cross-section having an axial cylindrical aperture within which is fitted a central cylindrical barrel 72. An axial bore 73 through the barrel 72 tapers outward at the front end thereof to accept the tapered chuck shank 68 which by impact therein is firmly locked in place but is removable by driving same outward as from the rear of the barrel through the axial bore 73. The barrel 72, and thus the chuck 67, is rotatable within the barrel holder 69 and special provision is made for precise angular dispositions of the chuck and barrel. At the rear of the barrel housing 69 there is attached an annular collar 74 which slip fits the barrel housing at this point and may be fixed thereon by a set screw 75 extending radially through the collar. The barrel extends through the collar 74 which is provided upon the back surface thereof with a plurality of radial grooves or flutes, as shown in Figure 5. Of these flutes there are four at right angles to each other and two other grooves one hundred and twenty degrees displaced from one of the aforementioned grooves. Thus in the orientation of Figure 5 there is provided vertically upward and downward flutes 76 and 77 respectively, a pair of oppositely disposed horizontal flutes 78 and 79, and two flutes 81 and 82, each disposed thirty degrees above one of the horizontal grooves. Cooperation is provided between the flutes of the collar 74 and the barrel 72 by means of a pin 83 adapted to fit into one of the flutes. A plurality of transverse bores 84 are axially displaced along the barrel 72 communicating between the exterior of same and the axial bore thereof. The pin 83 slidably engages the barrel 72 through a desired one of the transverses bores 84 therein and rests in one of the flutes in the collar 74 thus fixing the rotational disposition of the central cylinder and chuck about an axis through the barrel housing. An appropriate one of the bores 84 in the barrel 72 is chosen for insertion of the pin 83 to dispose the chuck and work at a desired distance in front of the barrel housing which is fixed to the turret as hereinafter described and the barrel is slid forward in the shell until the bar is engaged with one of the flutes in the collar 74.

Attachment of the barrel housing 69 to the turret 47 is accomplished by means of a pin 86 extending transversely through the barrel housing near the rear at the bottom thereof and into fixed attachment with the turret. The barrel housing is set into a slot in the side of the turret which is enlarged upwards at the front of the turret near the emery wheel and the barrel housing is pivotable about the pin 86 upwards from horizontal. Setting of the pivotal position of the barrel housing is accomplished by means of a bolt 87 extending from the turret through a slot 88 in a lug 89 extending upwards from the barrel housing. The lug slot 88 is formed along an arc about the pivot pin 86 and the bolt 87 may be tightened to hold the lug 89 against the turret and thus to fix the pivotal position of the barrel housing.

Additional elements of the invention include means for setting the work relative to the gringing wheel and for setting the work relative to the adjusting means of the work. Considering the first mentioned means, there is provided a hardened adjustable stop 92 carried upon an L-shaped element 93 that is in turn mounted upon the bed 26 adjacent the emery wheel 18. This element 93 has an elongated slot in the horizontal base portion thereof resting upon the bed and a bolt 94 extends therethrough from a threaded connection into the bed. By loosening this bolt the element is free to slide or pivot upon the bed near the emery wheel. The stop 92 in the general form of a tapered cylinder is mounted in the upright portion of the element 92 for vertical adjustment as by threaded engagement therewith and may be locked in place by a nut 96 threaded thereabout, as seen in Figures 1 and 3. With this stop 92 properly positioned and fixed as above noted it remains only to move such as a drill up against same by the aforementioned compound to center the drill relative to the emery wheel. Of course the movable stop 92 may be adjusted in position for aligning other work as desired in relation to the emery wheel or other configurations of grinding means carried by the conical carrier 11.

In order to properly utilize the simplified adjusting means of the barrel and associated elements in the grinding of drills, for example, it is necessary to first orient the drill with respect to the emery wheel. To this end there is provided a pawl 97 set into a slot in the front of the turret 47 and pinned at one end therein for pivotal motion in the plane of the barrel housing axis (when horizontal). This pawl 97 is adapted to be swung outward into contact with such as a drill held in the chuck 67. In use the pawl may be swung outward into contact with the drill 66 when the barrel 72 is retracted and the collar 74 turned on the barrel housing 69 until the drill is properly oriented so that for example a certain edge will be ground when the drill is moved directly forward into contact with the emery wheel. The collar 74 is then fixed upon the barrel housing by tightening the set screw 75. In this manner the drill 66 is fixed relative to the barrel housing and turret by the pin 83 and following grinding of one drill edge and retraction of the drill from the emery wheel, the barrel need only be slightly retracted in the housing and rotated to align the pin 83 with the proper other collar flute and thence urged forward to engage the pin in such collar flute to properly position the drill for grinding another drill edge. It will be seen that the grinding operation upon a drill for example is quite simple inasmuch as following initial drill orientation grinding of different drill surfaces requires only that the barrel be turned to place the pin in the appropriate collar flute for the type of drill being ground.

In use of the above-described invention it is emphasized that every degree of motion of the work is provided for. Thus the compound provides for lateral and axial translation of the work relative to the emery wheel as well as rotation thereof in a plane parallel to the axis of the emery wheel. Further the turret provides for complete 360 degree work rotation in a like plane and the barrel housing and attachments provide for precisely reproducible rotational drill positions with an absolute minimum of adjustments.

Figure 6:
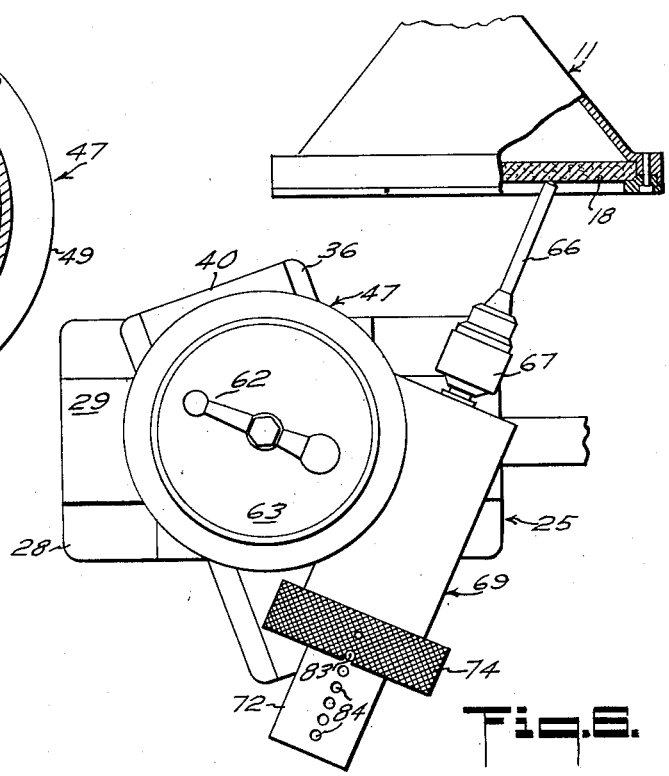
Figure 6 is a partial plan view of the grinding machine and illustrating certain component relationships for grinding the clearance angle of a drill.
Figure 7:
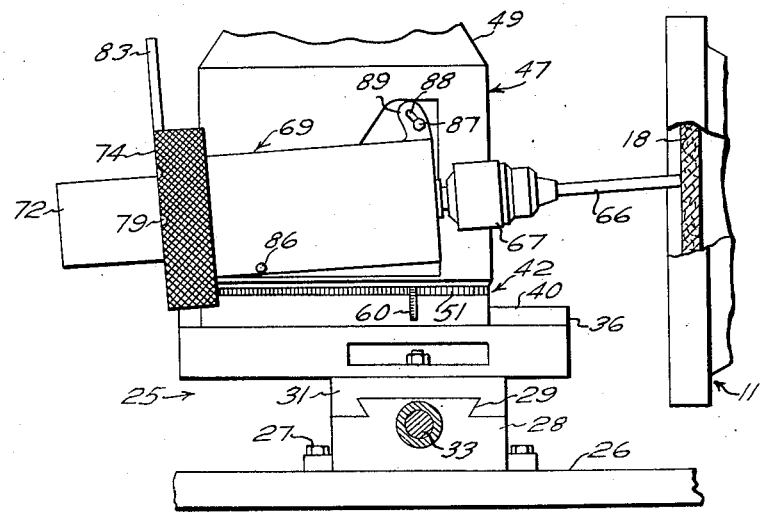
Figure 7 is a partial side elevational view of the grinding machine illustrating the operation of grinding a flat bottom drill.

Inasmuch as the present invention is advantageously useful in such a multiplicity of grinding operations it is not possible to comment upon each use and the particular alignment obtainable therefor. Use of the present invention will be clearly apparent to skilled craftsmen familiar with grinding techniques and thus it suffices merely to indicate examplary uses of the invention such as are illustrated in Figures 1, 6 and 7. Thus in Figure 1 an annular emery wheel is employed to grind the lands of a drill by moving the drill in and out of the wheel opening in contact with the inner periphery thereof. In Figure 6 the work holder of the invention is oriented to grind the clearance angle of a drill utilizing the flat outer surface of the emery wheel and in Figure 7 again the flat outer surface of the emery wheel is utilized to grind a flat bottomed drill wherein the barrel housing is pivoted to provide the desired grinding angle. Even the few foregoing examples illustrate the wide utility of the present invention and the use of certain of the work holder adjustments. With an emery wheel having a conical center depression twist drills may be ground to a high accuracy and with a very good reproducability of angle while a cup shaped wheel is highly advantageous for grinding fillets and the like. Also, negative rake may be readily gorund upon soft metals. Thus the invention is readily capable of performing conventional as well as very difficult grinding operations with a degree of accuracy and simplicity of operation hitherto not found combined in any single apparatus.

What is claimed is:

1. A grinding machine comprising a bed, a conical emery wheel holder mounted for rotation about a horizontal axis upon said bed, a compound affixed to said bed facing said wheel holder and including a first carriage horizontally movable along said bed and a second carriage horizontally movable in a transverse direction and rotatable relative to said first carriage, a turret rotatably mounted upon said compound and including raising and lowering means for varying the turrent displacement above the bed, and a barrel unit adapted to hold work to be ground and mounted upon said turret for controlled positioning of work relative to said wheel holder.

2. A grinding machine as defined in claim 1 further defined by said barrel unit including a barrel housing with a barrel slidably mating within same, stop means for fixing the position of said barrel within the barrel housing in predetermined positions, and a chuck removably mounted in said barrel.

3. A grinding machine comprising a fixed bed having a compound mounted thereon and an emery wheel holder affixed thereto for rotation about an axis parallel to the plane of the bed, said compound including a pair of members mounted for horizontal movement in normally related directions relative to said bed and one of said members being rotatable about a vertical axis, a turrent rotatably mounted atop said compound for full three hundred and sixty degree rotation in a plane normal to the plane of rotation of said emery wheel holder and including means for translating same normal to the plane of rotation thereof and to said compound, and a barrel pivotally mounted upon said turrent and movable in a plane parallel to the turrent axis for holding work to be ground in predetermined position relative to said emery wheel holder.

4. A grinding machine as defined in claim 3 further characterized by a barrel housing containing said barrel in slidable relation longitudinally and rotationally, a radially fluted collar about said barrel housing adjacent said barrel with said flutes disposed at predetermined relative angular separations, said barrel having a plurality of radial bores spaced longitudinally thereof, and a pin adapted for insertion in said radial barrel bores and mating with said flutes for adjustable disposition of said barrel in said housing.

5. A grinding machine as claimed in claim 3 further defined by a barrel housing pivotally mounted upon said turret and having a central cylindrical aperture through which said barrel extends in slidable relation, said barrel having a plurality of aligned radial bores spaced axially of said barrel, a radially fluted collar slip fitting said barrel housing adjacent said barrel and rotatable thereon with lock means for fixing the angular position of collar upon housing, and a pin adapted to mate with said barrel bores and with said collar flutes for rapid angular barrel reposition by shifting said pin between collar flutes.

6. A grinding machine including a conical driven emery wheel holder, a compound fixed in front of said wheel holder and having elements movable at right angles relative to each other and rotatable in a plane normal to the plane of wheel holder rotation, a turret rotatably mounted atop said compound and including means for controlled raising and lowering same above said compound, a barrel housing pivotally mounted on one side of said turret, a barrel adapted to hold work to be ground slidably engaging a bore in said barrel housing to extend therefrom toward said wheel holder, means for initially adjusting the angular disposition of said barrel in said housing, and means for changing the angular barrel disposition in said housing between predetermined fixed positions for facile work rotation relative to said emery wheel holder.

7. A grinding machine as claimed in claim 6 further characterized by said emery wheel holder having a conical configuration with the base thereof open and rotatable about the axis thereof, and an annular collar removably attached to said conical holder about the base periphery for holding an emery wheel thereon whereby emery wheels of various configurations are attachable to said wheel holder for rotation therewith.

8. A drill grinder including a driven rotatable emery wheel, a movable chuck for holding a drill directed generally toward said wheel, a compound having a base fixed in front of said wheel and a top table movable generally transversely and axially of said wheel, a turret rotatably mounted atop said compound and movable in a plane normal to the wheel axis, a barrel adapted to removably retain said chuck and having a plurality of aligned radial bores, a barrel housing engaging said barrel in slidable relation and having a radially fluted collar thereon, a pin adapted to mate with said barrel bores and said collar flutes for fixing the barrel extension and angular disposition, and means pivotally mounting said barrel housing upon said turret for controlled pivoting in a plane parallel to the direction of turret displacement.

9. A drill grinder as claimed in claim 8 further defined by said barrel housing collar having four radial flutes thereof disposed at ninety degree separations and two more flutes disposed at one hundred and twenty degrees separation from one of said four flutes for rapid adjustment to grind the separate faces of different kinds of drills.

10. A drill grinder as claimed in claim 8 further defined by said barrel housing having a circular end upon which said collar slidably fits, said collar having a radial set screw therein for fixing the angular disposition of said collar on said barrel housing, and an adjusting pawl pivotally mounted on said turret for engagement with a drill carried in said chuck to initially position same and setting the angular collar position to be fixed by the set screw thereof.

11. A grinding machine comprising a compound having a table adapted for translation in two directions, a turret rotatably mounted upon said compound, a housing pivotally mounted upon said turret, an axially apertured barrel adapted to receive a movable chuck slidably mounted upon said turret and having a plurality of aligned radial bores spaced axially thereof, a radially fluted collar slidably engaging said housing and a pin slidably fitting said barrel bores and said collar flutes for setting the relative angular position of said barrel in said housing.

12. A grinding machine comprising a horizontal bed having a compound rotatably mounted thereon, extensible work holding means, a turret mounting said work holding means and including an inner cylinder rotatably mounted upon said compound with an outer cylinder slidably engaging same and keyed thereto for rotation therewith, and a vertical screw extending through said turret between the inner and outer cylinders thereof in threaded engagement with one of same for raising and lowering the outer cylinder upon the inner cylinder of said turret.

References Cited in the file of this patent
UNITED STATES PATENTS

| | | |
|---|---|---|
| 1,807,999 | McMurtry | June 2, 1931 |
| 2,173,555 | Hipple | Sept. 19, 1939 |
| 2,401,874 | Kilbride | June 11, 1946 |
| 2,795,091 | Umbdenstock | June 11, 1957 |